(12) United States Patent
Langlotz

(10) Patent No.: US 12,206,987 B2
(45) Date of Patent: *Jan. 21, 2025

(54) DIGITAL CAMERA WITH MULTI-SUBJECT FOCUSING

(71) Applicant: Bennet Langlotz, Dallas, TX (US)

(72) Inventor: Bennet Langlotz, Dallas, TX (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/669,405

(22) Filed: Feb. 11, 2022

(65) Prior Publication Data

US 2022/0400211 A1    Dec. 15, 2022

Related U.S. Application Data

(63) Continuation-in-part of application No. 17/345,677, filed on Jun. 11, 2021, now Pat. No. 11,283,989.

(51) Int. Cl.
| | |
|---|---|
| *H04N 23/67* | (2023.01) |
| *G03B 5/00* | (2021.01) |
| *G06T 5/50* | (2006.01) |
| *G06V 40/16* | (2022.01) |
| *G06V 40/18* | (2022.01) |
| *H04N 23/611* | (2023.01) |

(52) U.S. Cl.
CPC ............ *H04N 23/676* (2023.01); *G03B 5/00* (2013.01); *G06T 5/50* (2013.01); *G06V 40/16* (2022.01); *G06V 40/18* (2022.01); *H04N 23/611* (2023.01); *H04N 23/675* (2023.01); *G03B 2205/0007* (2013.01); *G06T 2207/10016* (2013.01); *G06T 2207/10148* (2013.01); *G06T 2207/20212* (2013.01); *G06T 2207/30201* (2013.01)

(58) Field of Classification Search
CPC ......... H04N 5/232127; H04N 5/23219; H04N 5/23248
USPC .......................................................... 348/114
See application file for complete search history.

(56) References Cited

U.S. PATENT DOCUMENTS

| | | | | |
|---|---|---|---|---|
| 7,248,796 | B2* | 7/2007 | Triteyaprasert ...... | H04N 23/635 348/346 |
| 7,463,296 | B2* | 12/2008 | Sun ...................... | H04N 23/741 348/E5.041 |
| 8,849,064 | B2* | 9/2014 | Mocanu ............... | H04N 23/635 382/233 |
| 9,025,070 | B2* | 5/2015 | Saito .................... | H04N 23/632 348/345 |
| 9,294,678 | B2* | 3/2016 | Takahashi ............ | H04N 23/675 |
| 9,386,213 | B2* | 7/2016 | Matsumoto .......... | H04N 23/676 |
| 9,386,215 | B2* | 7/2016 | Ono ...................... | G03B 13/36 |
| 9,531,938 | B2* | 12/2016 | Ogura ..................... | G02B 7/28 |
| 9,596,412 | B2* | 3/2017 | Lee ........................ | H04N 23/632 |

(Continued)

*Primary Examiner* — Pritham D Prabhakher

(74) *Attorney, Agent, or Firm* — Bennet K. Langlotz; Langlotz Patent & Trademark Works, LLC

(57) ABSTRACT

A camera system comprising a body that contains a lens with a range of focus settings and an image sensor operable to record an image. The camera system has a controller operably connected to the sensor to receive the image, and the controller is operably connected to the lens to control the focus setting. The controller is operable to focus the lens on a selected point, and the controller is operable to determine at least two different first and second subject elements. The controller is operable to focus the lens on the first subject and record a first image, and the controller is operable to focus the lens on the second subject and record a second image.

15 Claims, 6 Drawing Sheets

(56) References Cited

U.S. PATENT DOCUMENTS

| | | | |
|---|---|---|---|
| 10,375,292 B2* | 8/2019 | Park | H04N 13/207 |
| 10,382,691 B2* | 8/2019 | Jung | G06T 7/11 |
| 10,917,571 B2* | 2/2021 | Shanmugam | H04N 23/632 |
| 11,082,606 B1* | 8/2021 | Gamadia | G06T 7/80 |
| 11,095,808 B2* | 8/2021 | Kim | H04N 23/63 |
| 11,212,489 B2* | 12/2021 | Yoshimura | H04N 23/745 |
| 2003/0011700 A1* | 1/2003 | Bean | H04N 23/959 348/E5.04 |
| 2005/0168620 A1* | 8/2005 | Shiraishi | H04N 23/633 348/E5.045 |
| 2005/0212952 A1* | 9/2005 | Triteyaprasert | H04N 23/635 348/E5.045 |
| 2009/0059061 A1* | 3/2009 | Yu | H04N 23/675 348/347 |
| 2012/0120269 A1* | 5/2012 | Capata | G06F 18/2148 348/222.1 |
| 2012/0188394 A1* | 7/2012 | Park | G06T 5/008 348/222.1 |
| 2012/0281132 A1* | 11/2012 | Ogura | G06T 5/003 348/E5.045 |
| 2013/0050565 A1* | 2/2013 | Wernersson | H04N 23/676 348/E5.045 |
| 2013/0070145 A1* | 3/2013 | Matsuyama | H04N 23/62 348/333.12 |
| 2013/0135510 A1* | 5/2013 | Lee | H04N 23/743 348/333.02 |
| 2013/0188090 A1* | 7/2013 | Saito | H04N 23/632 348/345 |
| 2014/0152775 A1* | 6/2014 | Ji | H04N 13/207 348/46 |
| 2014/0192216 A1* | 7/2014 | Matsumoto | H04N 23/61 348/222.1 |
| 2014/0226914 A1* | 8/2014 | Mocanu | H04N 23/743 382/255 |
| 2014/0285649 A1* | 9/2014 | Saitou | H04N 23/698 348/77 |
| 2015/0009366 A1* | 1/2015 | Yamada | H04N 23/67 348/240.2 |
| 2015/0049946 A1* | 2/2015 | Madineni | G06T 7/11 382/173 |
| 2015/0055007 A1* | 2/2015 | Takahashi | H04N 23/675 348/333.11 |
| 2015/0195449 A1* | 7/2015 | Ono | G03B 13/36 348/349 |
| 2015/0264335 A1* | 9/2015 | Park | G02B 7/38 348/49 |
| 2016/0021293 A1* | 1/2016 | Jensen | G06V 40/16 348/349 |
| 2016/0360091 A1* | 12/2016 | Lindskog | H04N 23/676 |
| 2017/0318226 A1* | 11/2017 | Jung | H04N 23/741 |
| 2018/0063409 A1* | 3/2018 | Rivard | H04N 23/611 |
| 2018/0131869 A1* | 5/2018 | Kim | G06V 40/172 |
| 2018/0213144 A1* | 7/2018 | Kim | H04N 23/63 |
| 2019/0215440 A1* | 7/2019 | Rivard | G06V 10/22 |
| 2019/0243376 A1* | 8/2019 | Davis | G06T 7/292 |
| 2019/0356842 A1* | 11/2019 | Shimada | H04N 23/67 |
| 2020/0145583 A1* | 5/2020 | Shanmugam | G06T 11/60 |
| 2021/0149274 A1* | 5/2021 | Kang | G06N 3/08 |
| 2022/0187509 A1* | 6/2022 | Taveniku | G06T 5/50 |

\* cited by examiner

DIGITAL CAMERA WITH MULTI-SUBJECT FOCUSING

CROSS-REFERENCE TO RELATED APPLICATIONS

This application is a Continuation-in-Part of U.S. patent application Ser. No. 17/345,677 filed on Jun. 11, 2021, entitled "DIGITAL CAMERA WITH MULTI-SUBJECT FOCUSING," which is hereby incorporated by reference in its entirety for all that is taught and disclosed therein.

FIELD OF THE INVENTION

This invention relates to digital cameras, and to enhancing auto focusing performance and image processing.

BACKGROUND OF THE INVENTION

Cameras and other imaging devices normally have a single plane of focus, with a range of acceptable focus ("depth of field") near that range. Large apertures are useful for low light imaging, but create a narrower focal range. This means that it is impossible in some circumstances to generate sharp images of multiple subjects at different focal distances without the aid of external lighting, narrower apertures, and other measures that can affect desired images.

Modern digital cameras may employ a capability called "focus stacking" in which a fixed camera images a stationary inanimate subject (such as for product photography) and takes a series of many images at regular focal distance intervals. Each image is at an incrementally different focal distance to cover the range of distances from the closest to the farthest point of the subject, with the distances being selected for even spacing in the range, without regard to the elements of the subject or their distance. The image distance intervals are narrow enough to ensure that the intervals are less that the depth of focus of each image to that all subject points are in focus for at least one of the images. The images are then post-processed into a single image that uses the sharpest image segment for each area on the subject to generate an overall sharp image.

While effective for stationary subjects this is not useful for moving subjects like people. Even a person sitting relatively still for a portrait may move enough to generate misalignment of the images. Moreover, the number of images required can be in the dozens or even hundreds to cover large subjects, requiring extended periods when motionlessness is required. For example, even a fast 20 frames per second shutter with a limited 20-frame image will require one second of motionlessness, which is beyond the capacity for hand-holding, subject motion, and image stabilization. Moreover, the appearance of having all points of a subject in focus is unnatural and may be undesirable in instances when only selected elements (at different focal distances) are desired to be in focus. For example, a sharp image of each person in a small group (or of all facial features of a model) while the background is blurred to eliminate distractions.

Accordingly, there is a need for a camera system comprising a body that contains a lens with a range of focus settings and an image sensor operable to record an image. The camera system has a controller operably connected to the sensor to receive the image, and the controller is operably connected to the lens to control the focus setting. The controller is operable to focus the lens on a selected point, and the controller is operable to determine at least two different first and second subject elements. The controller is operable to focus the lens on the first subject and record a first image, and the controller is operable to focus the lens on the second subject and record a second image.

DETAILED DESCRIPTION OF A PREFERRED EMBODIMENT

Figure 1:
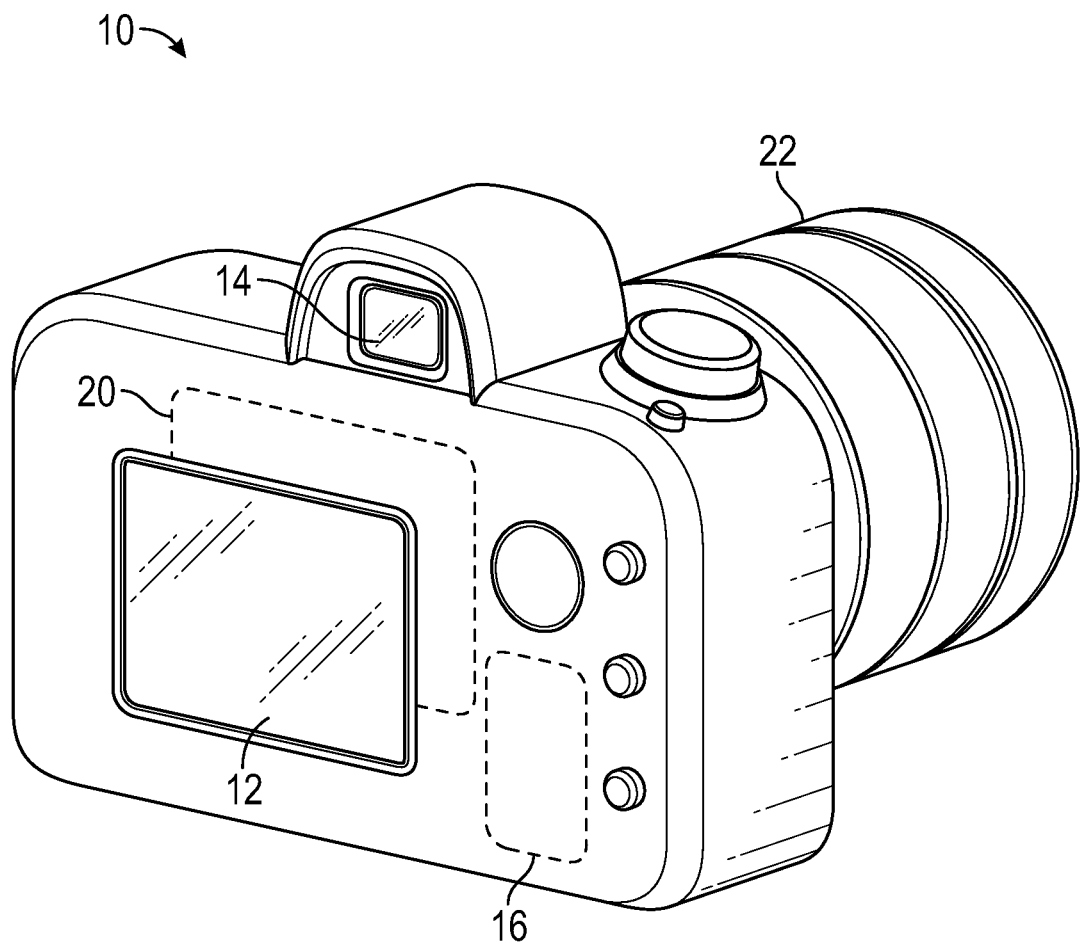
FIG. 1 shows a camera according to a preferred embodiment of the invention.

FIG. 1 shows a digital camera 10 with an electronic display screen 12 and viewfinder screen 14. The camera includes an internal controller 16 connected to an image sensor 20 and operable to display the sensor image on both screens. It also interfaces with the camera lens 22 to control autofocus, and may generate indicators of focus points on the screen. The camera may detect faces and eyes in the image, and these may be preferred auto-focus points.

Figure 2:
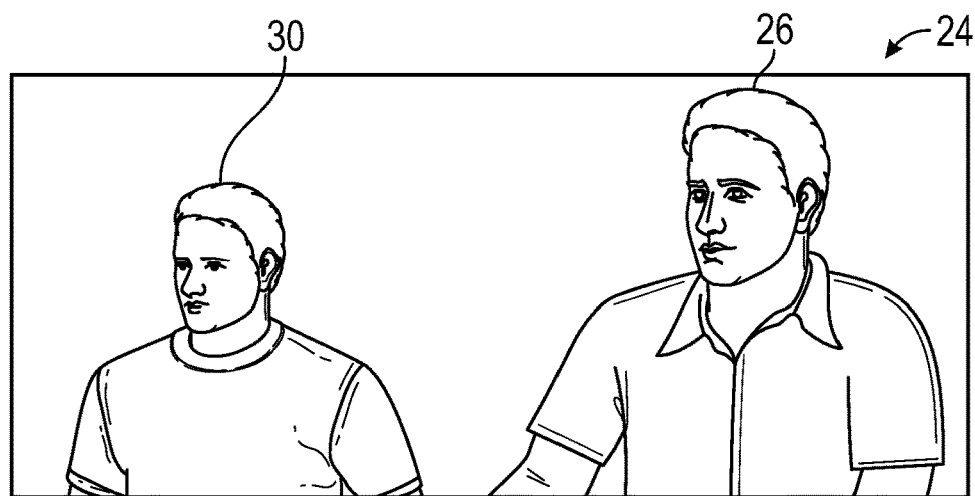
FIGS. 2-13 show alternative embodiments of the invention.

The system operates to image a scene 24 shown in FIG. 2. The scene has at least two subjects 26 in the foreground, and 30 at a greater distance from the camera, in the background. In this example the subject are two people, each with a visible face. The controller analyzes an initial image generated by the sensor to determine the image content, and to identify and locates subjects of potential interest, such as by using known algorithms for face detection eye detection, and presumed priority of subjects.

Figure 3:
Figure 4:
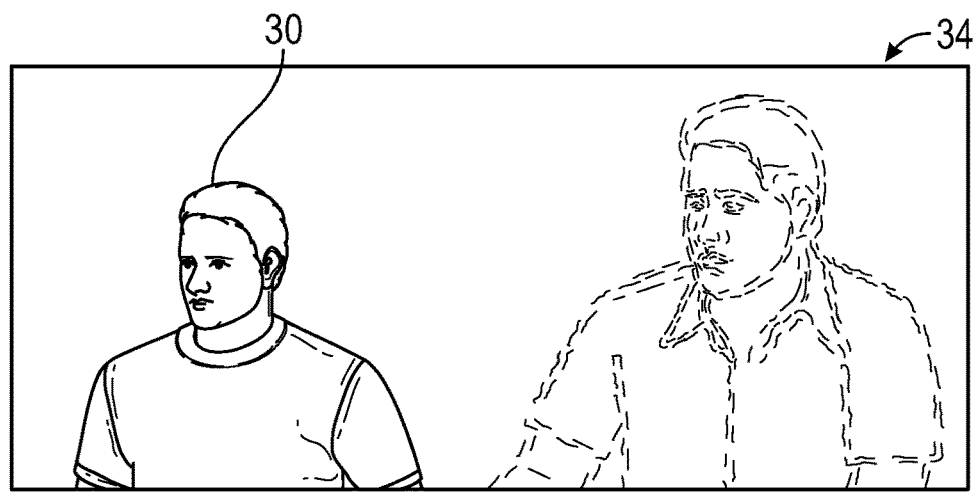
Figure 5:
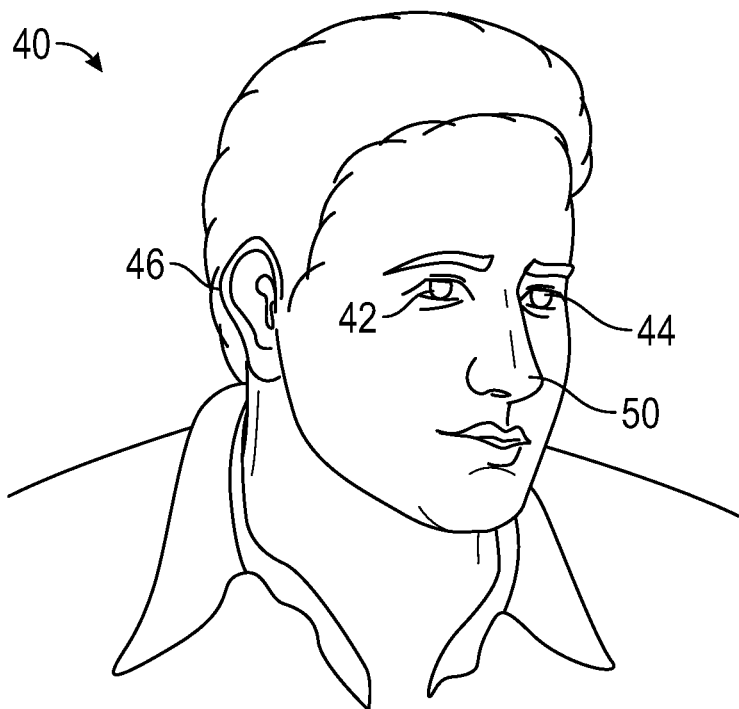

When the two subjects are at different focal distances such as is illustrated, the camera operates to take two images in rapid succession. FIG. 3 shows a first image 32 with subject 26 in focus, and FIG. 4 shows second image 34 the other subject 30 in focus. The images may be captured as rapidly as possible at the camera's fastest frame rate, which may be 10 or 20 or 30 frames per second, or other values depending on the user's selection and advancing technology. Preferably the frame rate is at least 5 FPS, and more preferably 10 FPS or more to generate imaging in an interval during which subject movement and camera shake after stabilization is acceptable The sequence of captured images may simply be stored, for (in one basic usage) the user later to select which is the desired single subjects in an otherwise normally focused image. This avoids the need for the photographer to select from among subjects during the imaging event. An example might include a sideline image of a football line of scrimmage, with a rapid sequence of each of the linemen being imaged in focus. Notably for all embodiments, the system does not simply take a sequence of images at limited intervals irrespective of the subjects' actual locations in hope of getting everything approximately in focus. It operates to select image focal distances based on the location of actual subjects, and operates preferably to focus specifically on selected and identified subjects, with only that many images captured, and each subject optimally in focus. Even two subjects at very different focal distances will have images captured rapidly in sequence without intervening images to create an undesired delay in capturing the two (or more) most critical subjects.

In more advanced embodiments, the image is processed and composited using the techniques associated with conventional focus stacking or bracketing to create a single image with both (or all) subjects in focus. In a simple example, the sharply focused face is overlaid on the same subject's blurry face of the other image, in the sense of photoshopping a face in a group image to eliminate an eye blink. In the simple example, the face may be positioned in the same location on the frame, with the assumption that the brief interval between shots does not cause an objectionable offset.

In a more advanced system, the blurred image of the subject is analyzed to establish location datum points, and these are correlated with location datum points in the sharply focused face image, so that the sharp face is pasted onto the main image in registration with the face (or any subject) of the reference image. For instance, the blurry eyes of the left subject in FIG. 3 could be located to estimate a registration point to align the sharp eyes of the same subject from FIG. 4. The sharp face can then be overlaid, not necessarily only based on the same pixel-for-pixel location if there was no camera shake or subject motion, but to reregister the sharp image even if the subject moved relative to the right foreground subject or relative to the background.

More than just the face or other key element of the second image may be composited with the first image. While the boundary of the face may be identified and pasted onto the other image, more advanced approaches may be employed. As with focus bracketing systems, each location may be assessed to determine which of the two or more images is in closer focus to represent that location more sharply. This will ensure smooth transitions where each image is about equally out of focus (or sharp) at a transition between images. And as with location of the sharp element in registration with the location of the blurred image of the same element, the transition areas may be stretched and shafted to ensure that there is registration potentially at many different points along a perimeter between images.

Foreground and background blur control may be employed. In the illustrated case of the nearer and farther subjects of FIGS. 2-4, one option as discussed above is to use one frame as the master, and pasting only limited critical elements of the second frame. An alternative to this is to use images elements based on which image they are sharper in.

The nearer subject would be captures along with foreground subjects and other subjects closer to the camera than a midpoint between subjects that are rendered equally sharp in either image. The background and beyond-midpoint subjects would be taken from the image in which the background subject is sharp. A third option is to do the reverse, and to use the blurrier background from the image focused on the nearer subject to provide an often desired, and the blurrier foreground (if any) from the image focused on the farther subject. This provides a sometimes-desired greater blur of non-subject elements. A basic version toward this result where only background is a concern is to bias toward using the foreground subject image as the master image to get the blurriest background, and compositing in only the rear subject as needed. In any embodiment, these alternatives can be all tested in post processing and the user (or expert system) given the choice between the different looks provided, and to avoid any approaches that introduce unwanted artifacts be rejected in favor of better results.

Figure 6:
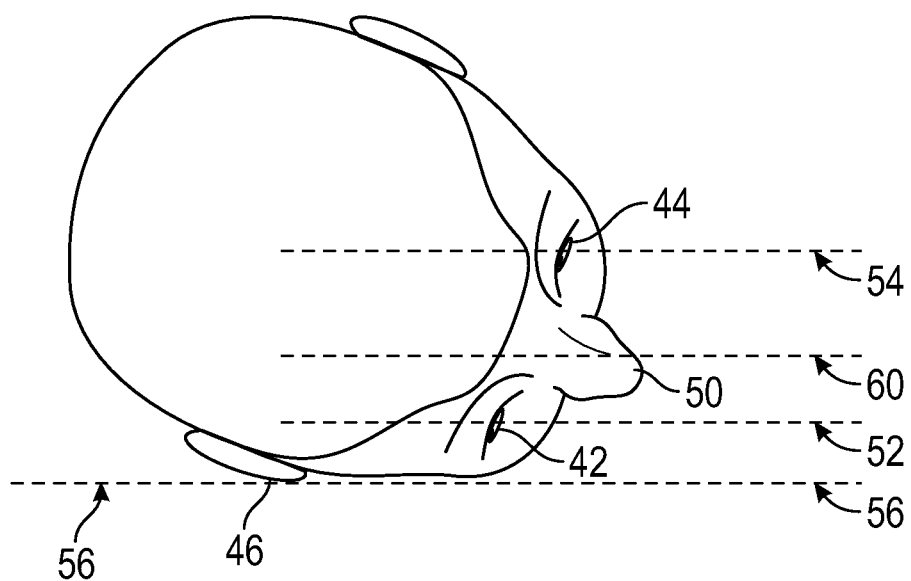

An additional implementation for a person's face 40 is depicted in FIGS. 5-10. Here, the subjects are selected points of interest on a single person depicted. In the simplest example, each of the person's two eyes are the subjects desired to be in focus. As illustrated, the person has a near eye 42, far eye 44, near ear 46, and nose 50, each at different focal distances from the camera recording the depicted image. FIG. 6 shows the focal planes. Near eye focal plane 52, far eye focal plane 54, near ear focal plane 56, and nose focal plane 60.

Figure 7:
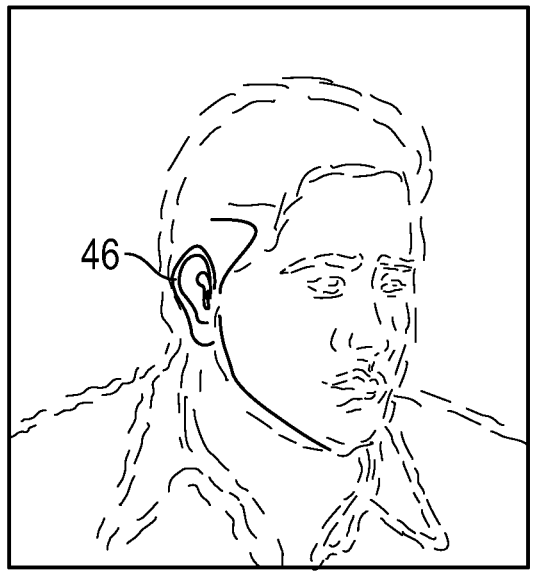
Figure 8:
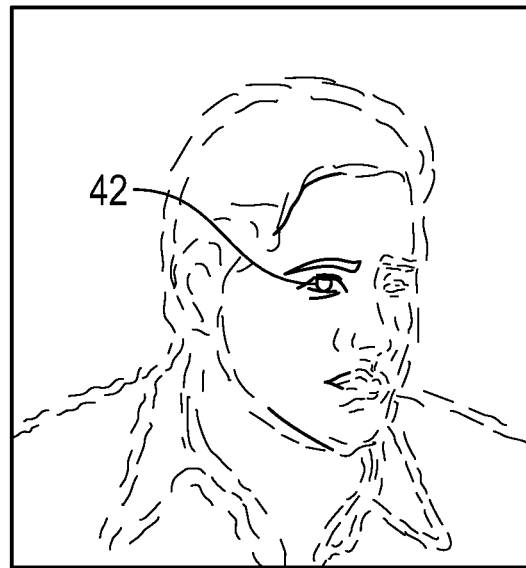
Figure 9:
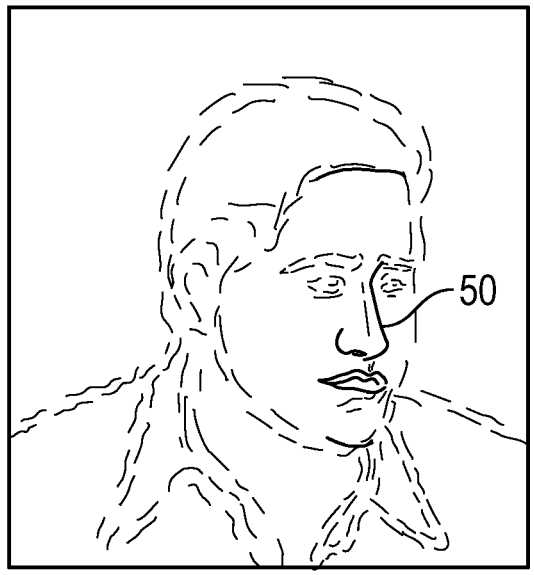
Figure 10:
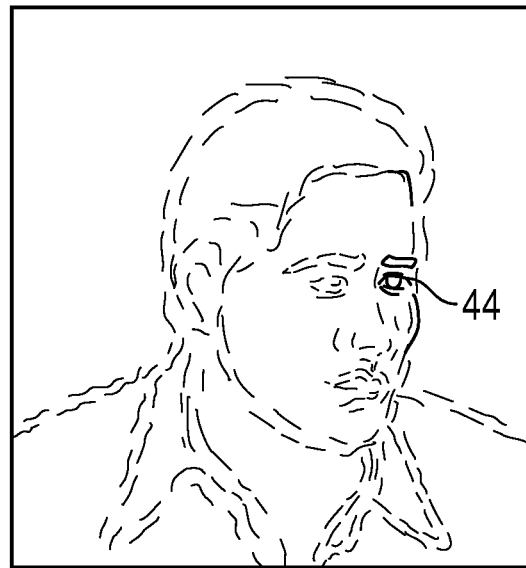

FIG. 7 depicts the image with the near ear 46 in focus.
FIG. 8 depicts the image with the near eye 42 in focus.
FIG. 9 depicts the image with the nose 50 in focus.
FIG. 10 depicts the image with the far eye in focus.

The system may be programmed to recognize any of these specific elements, and to shoot images in rapid succession, with each in focus, changing focus between images. As above, the images may be composited in the manner of focus stacking systems, or the sharp selected features may be composited into a selected master image.

In an alternative embodiment, the nearest and farthest desired subjects may be identified, and the camera operated to automatically shoot a number of evenly spaced images at focal distances between the selected subjects, creating an effective depth of field. The intervals may be evenly spaced, and may be based on an analysis by the processor or controller of whether the selected subjects are at far apart enough focal distances to necessitate one of more intermediate images to generate sharp images (such as the nose of a subject when focusing primarily on a near and far eye). Also, if the subjects are separated (as with two people in foreground and background) how many images are required between the two selected focal distance extremes. This may also determine whether other subjects are in view in the middle distance between the two primary subjects. Because the intermediate subject matter may be of lesser importance, the camera may first image the two or more primary subjects detected and identified as important, then capture the intermediate focal distance images that are less problematic iflost due to subject movement of camera shake.

Conventional focus stacking may be improved (made faster and potentially hand-holdable) by employing similar principles by using a detected subject such as a face or eye at the starting point, and optionally a second detected subject as an end point, using appropriate intervals as determined by automatic image analysis (e.g. more images at tighter intervals for large aperture fast lens settings with thin depth of focus, fewer for smaller aperture slow lens settings). FIG. 6 shows four focal distances with uneven spacing, but some systems may simply use the extreme (nearest and farthest) subjects and have the intermediate distance subjects imaged not by their detection and focus at their distance, but approximated by even intervals or other intervals based on other factors. Note that even intervals may be considered "even" in the sense of actual distances, but are more likely calculated as a function of distance that may be geometric or exponential, and based on tolerated defocus degree. This improved focus stacking may also employ a manual user-established selection of subjects, simply by the user manually focusing the lens on the close focus distance desired and indicating the selection (the nearest point on the subject, possibly a product being photographed, or a studio portrait subject's nose tip), and then focusing to the far limit of desired focus and indicating that selection. Even ordinary focus stacking systems without one of more end point focal distances based on detected or selected subjects may help the user by suggesting interval spacing based on camera-calculated depth of focus for a tolerable level of focus on all intermediate points. For instance, a 100 mm lens at f2.8 for a subject ranging from 2 feet to three feet would be calculated to require, say, 10 images, so that the user needn't guess a time consuming and memory-clogging excessive number, nor a needlessly skimpy limited number leaving some less than desirable focus areas.

The image processing may be in camera or post processing, and may be done interactively with the user who may select from the recorded images.

Additional Embodiments, Features, and Clarifications

An alternative focus stacking feature may employ manual selection of at least one limit of focus by user input. This may be made as noted by selecting a subject or image area using a cursor or touch screen, or by selecting a focal distance by manually or automatically focusing to a limit (such as a near subject) and then indicating to the camera the selection such as by a button, voice command, or other input. While useful to select both limits, in some cases only a single user-selected input is needed, such as when the other limit is at infinity or at closest focus.

A focus stacking embodiment may differ from conventional focus stacking in that at least one of the image distances may be based on a subject's focal distance, either as manually selected or at automatically determined. Conventional systems employ a sequence of image distances that range from closer to the desired subject(s) to beyond the subjects, with the understanding that the small change in focus will mean that all elements are in sharp focus; the system does not base focus distances on the actual subject distance, but merely over a range that includes the subject but is not focused on it—no one image is focused on a subject, only at incremental distances based on things other than the actual subject distance. The preferred embodiment may base one of the several images on one subject, and then have a range that extends in one or both directions toward and away from the subject by appropriate increments. As an alternative, a second (or more additional) subject may be forced for one of the incremental distances, either as an extra shot in the range of distances, or as a primary second point, with the interval between first and second image to be subdivided into appropriate mathematical increments.

Figure 11:
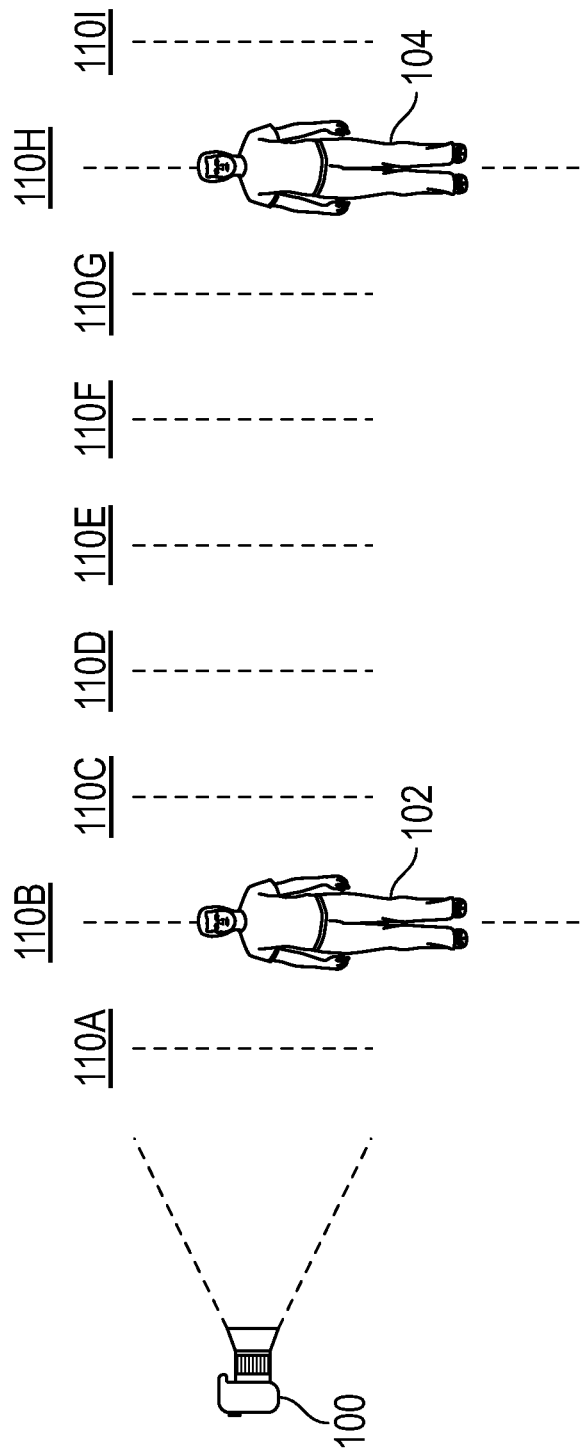

FIG. 11 shows a focus stacking method in this a camera 100 is imaging a first subject 102 and second subject 104 at different distances. A sequence of images are captured, each with a different focal distance setting, ranging from 110A to 110I. In this example, the image 110B is focused deliberately based on the identified first subject 102 to render that subject as sharply as possible, instead of relying on it being close enough to one of the adjacent focal distances as in conventional focus stacking. This alone provides optimal focus on a dominant subject, with the other focal distances providing adequate sharpness for the rest of the image and other subjects.

Figure 12:
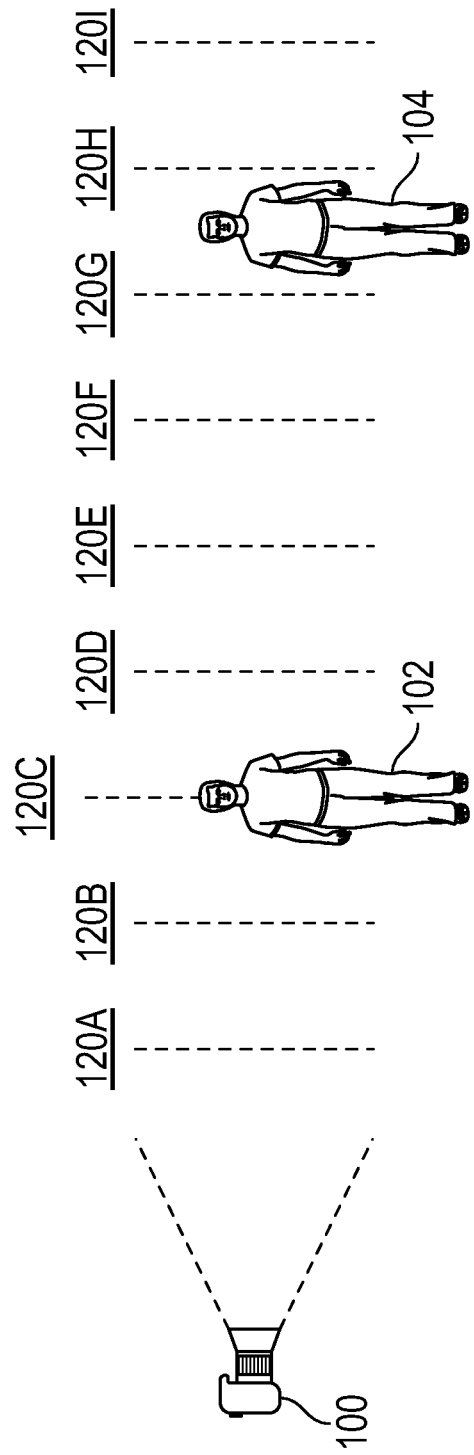

In such an application with only one subject 102 deliberately focused in plane 120C as shown in FIG. 12, the others may be at increments evenly spaced from the subject as shown, with 120B and 120D focal distances being spaced away from the subject by a common spacing or ratio that is continued beyond as shown by 120A, E, F, etc. Secondary FIG. 104 is between focal distances 120G and 120H, and is considered tolerably but not precisely focused.

Figure 13:
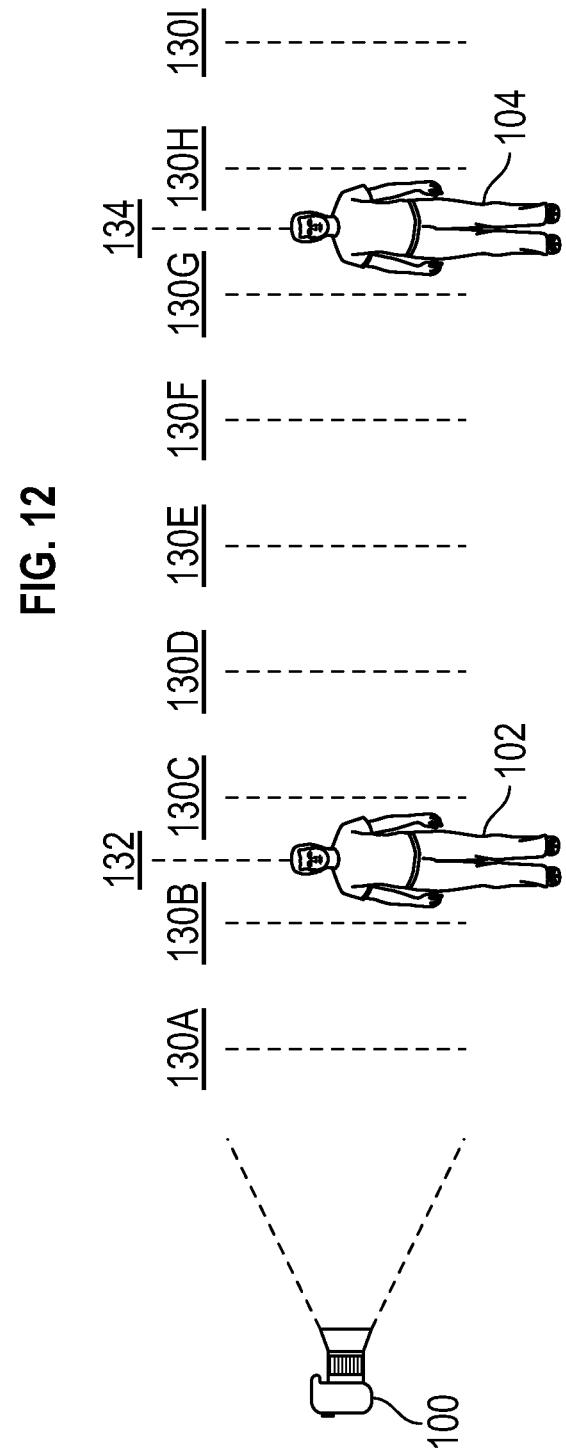

Alternatively as shown in FIG. 13 the system may use conventional focus stacking with increments 130A-I based not on the subject, but conventionally over a defined range extending from nearer the nearest subject to beyond the farthest subject, with the improvement being the inclusion including one additional image 132 in the stack for the first subject 102 (and optionally multiple additional images 134 for each selected desired subject 104).

FIG. 11 illustrates an embodiment in which multiple subjects are deliberately focused on for elements of the image stack, with the first subject 102 sharply depicted at focal distance 110B as noted above to optimize sharpness of the subject, and also subject 104 captured sharply as the deliberate point of focus at distance 110H (each indicated distance is a frame in the stack focused at that distance). In this example, the distance between the subjects is divided mathematically into essentially equivalent intervals of adequate narrowness to provide reasonably sharp focus on all intervening points. Note that this mathematical division may be any numeric function, whether based on actual distance, degree of tolerated defocus, increment of focus motor operation, and any linear, geometric, logarithmic or other function that would be useful for focus stacking. With multiple subjects, the non-subject frames may alternatively be made at arbitrary increments that are conventionally evenly spaced without regard to subject distance, with all subject images being supplemental to the stack.

With respect to the imaging of two subjects at different focal distances, it is notable that the camera has a single lens. While it normally has numerous lens elements, it is a single lens in the sense that it focuses only at one distance. Only one plane of focus is provided, and anything away from that distance will be depicted less sharply based on how far it is from the focal distance.

This is to be contrasted with bifocal systems that are essentially two lenses, each having its own focal distance. These enable to simultaneous focus on different-distance subjects, such as for broadcast of a footrace with two different runners at different distances, each in a different half of the frame. Such bifocal systems are simultaneously in focus on two different subjects, and do not shift focus from one to the other. They require complex dedicated systems having multiple lenses (or lens segments) and can focus only on as many subjects as they have lenses (typically two). Such systems will typically divide the frame in half arbitrarily based on the field of coverage of each lens, and this dividing line is preestablished without respect to the subject image. Such bifocal lens systems are unable to change the number of subjects in focus, and are unable to base the number of images captured and composited based on the number of desired subjects. For instance, the preferred embodiment may generate an image of basketball players on a court with each player in focus (acknowledging that in this example subject motion may be a challenge at current frame rates and a group portrait may be a more apt example).

In the preferred embodiment the two images are composited along a potentially complex boundary that may be as simple as an irregular oval around an eye or a face, or a complex set of contour lines based on lines of equivalent defocus. The analogy is superimposing two topographic maps in which elevation is the analog of sharpness, and at each point on the map, employing the data from the higher elevation map at that point. The boundaries between areas drawn from the first map and the second map will be the lines of equal elevation. Analogously, the boundaries between the first image and the second image will be the lines of equal defocus. The system can make exceptions to tolerate minor differences of defocus degree to avoid capturing large and irrelevant areas of an image, tolerating a threshold of difference to close a gap in the boundary around a desired subject such as a face or an eye.

In alternative embodiments, the compositing process may take note of whether the color or brightness of a location has varied significantly from one image to the other in a way that is not explained by a focus difference, but more likely due to subject motion. Such instances may be verified or discovered by defocusing the shaper image at that location to compare. If a difference is found, the compositing process may seek a second choice nearby area or boundary path that avoids the area with shifted subject but has tolerable similarity of defocus adequate to avoid an objectionable discontinuity between sharp and blurred. In some embodiments, the original images are preserved to enable various choices to be offered to the user for approval.

In further alternatives, a rapid sequence of images continuing more than one per subject may be imaged, allowing the generation of a composite image based not just upon sharpness, but on subject expression (avoiding a blink, for instance). This may be attained either with at least two rapid-fire image of the first subject in focus, then without delay two or more images of the second subject in focus. The images just before and after the focus transition are most likely to be aligned in the event of some subject motion, but the prior and subject images may offer usable substitutes in the event these are flawed.

As discussed, the proposed system is for images captured in rapid succession to minimize the time between images to minimized subject movement and misalignment. The images are captured "without delay" in the sense of no added delay or pause other than as necessary for the system. The capture is "immediate not in the sense of simultaneous, but only in the sense of one being as immediately after the other as is technically possible. This is understood to convey that there is no pause or unnecessary delay between the images, and that they are recorded as rapidly as possible under the conditions and capabilities of the equipment. When a mechanical shutter is desired, it may have a slower rate than an electronic or global shutter.

It is anticipated that future camera, sensor, and processor advancements may generate effective shutter speeds comparable to that of video with frame rates of 60, 120, and 240 FPS and up. In these instances, the rate of lens focus may be a limiting factor, and "as fast as possible" relates to the time required to physically move lens elements to change the point of focus. In such instances, the system is imaging sequentially without delay, other than the necessary time to focus. In extreme alternatives, the imaging may be continuous at the fastest available frame and the lens focus swept at highest speed from one focal distance to the other even if images are captured of intermediate distances between the subjects.

In different embodiments, the compositing and other image processing following capture may be done either in the camera to generate one image, with or without preserving the source images. The compositing may also be done in post process with a different processor other than the camera (such as a computer workstation).

The invention claimed is:

1. A camera system comprising:
a body;
a lens having a variable focus setting with a rate of focus having a highest speed of focus;
an image sensor operable to record an image;
a controller operably connected to the sensor to receive the image;
the controller operably connected to the lens to control the focus setting;
the controller operable to determine at least a first subject at a first subject distance and a different second subject at a different second subject distance;
the controller operable to set the variable focus setting of the lens to focus the lens at the first subject distance and record a first image recording the first subject and the second subject; and
the controller operable automatically and sequentially immediately after recording the first image, to change the variable focus setting of the lens to focus the lens at the highest speed of focus at the second subject distance and record a second image recording the first subject and the second subject, such that in the first image the first subject is depicted in focus and the second subject is depicted out of focus, and in the second image the second subject is depicted in focus and the first subject is depicted out of focus.

2. The camera system of claim 1 wherein determining the first subject and the second subject includes recognizing two different faces.

3. The camera system of claim 1 wherein determining the first subject and the second subject includes recognizing two different eyes of two different individuals.

4. The camera system of claim 1 wherein the controller is operable to record the second image immediately after recording the first image without intervention by a user.

5. The camera system of claim 1 wherein the system is operable to determine a number of subjects greater than two subjects, and record a number of images based on the number of subjects.

6. The camera system of claim 1 including a processor operable to substitute a second image segment associated with the second subject from the second image for a first image segment associated with the second subject of the first image such that a resulting image depicts both the first subject and the second subject in focus.

7. The camera of claim 1 wherein the controller is operable to focus the lens at a third subject distance different from the first and second subject distances and to record a third image.

8. A method of operating a camera system having a lens to generate an image of first and second subjects at different focal distances, the method comprising:
providing an autofocus camera operable to focus an image on a sensor;
generating an image on the sensor;
identifying the first and second subjects in the image;
determining a first focal distance associated with the first subject and a second focal distance associated with the second subject, focusing the lens at the first focal distance and recording a first image; and
immediately and automatically after recording the first image, focusing the lens at the second focal distance and recording a second image, and
including processing the recorded images to substitute a second image segment associated with the second subject from the second image for a first image segment associated with the second subject of the first image such that a resulting image depicts both the first subject and the second subject in focus.

9. A camera system comprising:
a body;
a lens having a variable focus setting;
an image sensor operable to record an image and having a frame rate up to a fastest frame rate;
a controller operably connected to the sensor to receive the image;
the controller operably connected to the lens to control the focus setting;

the controller operable to determine at least a first subject at a first subject distance and a different second subject at a different second subject distance;

the controller operable to set the variable focus setting of the lens to focus the lens at the first subject distance and record a first image recording the first subject and the second subject; and the controller operable automatically and sequentially at the fastest frame rate after recording the first image, to change the variable focus setting of the lens to focus the lens at the second subject distance and record a second image recording the first subject and the second subject, such that in the first image the first subject is depicted in focus and the second subject is depicted out of focus, and in the second image the second subject is depicted in focus and the first subject is depicted out of focus.

10. The camera system of claim 9 wherein determining the first subject and the second subject includes recognizing two different faces.

11. The camera system of claim 9 wherein determining at least the first subject and the second subject includes recognizing two different eyes of two individuals.

12. The camera system of claim 9 wherein the controller is operable to record the second image immediately after recording the first image without intervention by a user.

13. The camera system of claim 9 wherein the system is operable to determine a number of subjects greater than two subjects, and record a number of images based on the number of subjects.

14. The camera system of claim 9 including a processor operable to substitute a second image segment associated with the second subject from the second image for a first image segment associated with the second subject of the first image such that a resulting image depicts both the first subject and the second subject in focus.

15. The camera of claim 9 wherein the controller is operable to focus the lens at a third subject distance different from the first and second subject distances and to record a third image.

* * * * *